United States Patent
Philipps et al.

(12) 
(10) Patent No.: US 6,705,821 B2
(45) Date of Patent: Mar. 16, 2004

(54) COLLAPSIBLE GAME HANGER FOR PICKUP TRUCK

(76) Inventors: Michael L. Philipps, 2690 Farmersville Rd., Mt. Vernon, IN (US) 47620; Terry L. Philips, 2690 Farmersville Rd., Mt. Vernon, IN (US) 47620; Charles Robinett, 11 Jones Rd., Havelock, NC (US) 28532

( * ) Notice: Subject to any disclaimer, the term of this patent is extended or adjusted under 35 U.S.C. 154(b) by 97 days.

(21) Appl. No.: 10/141,928

(22) Filed: May 10, 2002

(65) Prior Publication Data

US 2002/0168258 A1 Nov. 14, 2002

Related U.S. Application Data

(60) Provisional application No. 60/290,020, filed on May 11, 2001.

(51) Int. Cl.[7] .............................. A22B 1/00; B66C 23/44
(52) U.S. Cl. ........................ 414/462; 212/180; 212/294; 414/540; 452/190
(58) Field of Search ........................ 212/180; 224/321, 224/518, 519, 520, 521; 414/462, 563, 540; 452/187, 189, 190, 192

(56) References Cited

U.S. PATENT DOCUMENTS

| | | | |
|---|---|---|---|
| 4,338,703 A | 7/1982 | Tanner | 294/79 X |
| 4,746,263 A | 5/1988 | Cook | 414/543 |
| 4,806,063 A | 2/1989 | York | 414/462 |
| 5,205,700 A | 4/1993 | Lin et al. | 414/540 |
| 5,211,526 A | 5/1993 | Robinette | 414/550 |
| 5,419,672 A | 5/1995 | Poe | 414/540 |
| 5,540,537 A | 7/1996 | Welch | 414/462 |
| 5,662,451 A | 9/1997 | Muzzi et al. | 414/540 |
| 5,791,858 A | 8/1998 | Sasser | 414/462 |
| 5,993,137 A | 11/1999 | Harr | 414/550 |
| 6,045,442 A | * 4/2000 | Bounds | 452/187 |
| 6,109,855 A | * 8/2000 | Vela-Cuellar | 414/462 |
| 6,250,483 B1 | * 6/2001 | Frommer | 212/180 |
| 6,578,722 B2 | * 6/2003 | Perkins et al. | 212/180 |
| 6,626,748 B2 | * 9/2003 | Homer, Sr. | 452/189 |

* cited by examiner

Primary Examiner—Janice L. Krizek
(74) Attorney, Agent, or Firm—Richard C. Litman

(57) ABSTRACT

The game hanger apparatus is attachable to a tow hitch of a pickup truck. The folded game hanger can be taken to the site in the bed of the truck and speedily installed in the tow hitch for hanging, cleaning and butchering large game, such as deer and small bears. The apparatus comprises a mast and fixed boom of square cross-section, and having a winch, pulleys and a gambrel with a pair of end hooks and a pair of pins which engage a jib at the end of the boom to prevent the game from twisting. The horizontal bottom and top bars are locked in place by removable pins for operation, and unlocked by removing the pins for folding the unit for storage. The bottom bar is inserted into a tow hitch and locked in place with the hitch pin.

6 Claims, 4 Drawing Sheets

COLLAPSIBLE GAME HANGER FOR PICKUP TRUCK

CROSS-REFERENCE TO RELATED APPLICATION

This application claims the benefit of U.S. Provisional Patent Application Serial No. 60/290,020, filed May 11, 2001.

BACKGROUND OF THE INVENTION

1. Field of the Invention

The present invention relates generally to hoists. More specifically, the invention is a collapsible game hanger which prevents the game from twisting, installable on the trailer hitch drawbar of a pickup truck, and enables an open tailgate while utilizing the game hanger apparatus.

2. Description of Related Art

The related art of interest describes various hoists attachable to vehicles, but none discloses the present invention. There is a need for a game hoist apparatus which can be readily attached with the tailgate open, subsequently detached from a trailer hitch drawbar, and folded for transport or storage. The relevant art will be discussed in the order of perceived relevance to the present invention.

U.S. Pat. No. 4,338,703, issued on Jul. 13, 1982, to James M. Tanner, describes a game supporting device placed in a slot in a sidewall of a bed of a pickup truck or attached to the bumper of a truck. An upright cylindrical member has a perpendicular cylindrical member supported by a cylindrical brace. The upright member has a winch and a hand crank attached which supplies a cable through two rollers to a structure for hanging an animal carcass consisting of an upper horizontal crossbar connected by a pair of chains to a lower movable horizontal crossbar. The crossbars have perpendicular ends which point upward. The upright cylindrical member passes through a sleeve two sets of peripheral bores for insertion of pins to position the supporting device in various positions. A solid cylindrical member at the bottom of the support is inserted into the sidewall of a bed of a pickup truck. The apparatus is distinguishable for requiring a sleeve member, external roller linkages for the cable and two crossbars connected by chains.

U.S. Pat. No. 5,791,858, issued on Aug. 11, 1998 to Kenneth W. Sasser, describes a vehicle mounted game skinning device that is separable and connected to a receiver hitch assembly via a pin. The apparatus includes a winch and pulley assembly, an adjustable boom assembly and a gambrel for hoisting an animal. The apparatus is distinguishable for a game gambrel device which can readily twist when the game is hoisted and does not allow room for the tailgate to be lowered.

U.S. Pat. No. 4,806,063, issued on Feb. 21, 1989 to W. Clifton York, describes a portable wild game hoist that is separable for storage and comprises a winch and pulley assembly with a gambrel that attaches to the ball hitch. The assembly is stabilized by straps that attach to the vehicle fender wells and a torsion bar on the boom which bears against the closed tailgate or a plate which rests on the hitch ball. The hoist is distinguishable for having a twistable gambrel and anchoring elements which do not permit the lowering of the gate.

U.S. Pat. No. 5,540,537, issued on Jul. 30, 1996 to Wilmer M. Welch, describes a portable hoist which mounts to a trailer hitch drawbar receiver of a pickup truck that can use either a block and tackle or a pulley to support the winch cable. The hoist is distinguishable for its proximity to the tailgate, which must be closed, and the swinging terminal hook of the block and tackle or pulley system.

U.S. Pat. No. 4,746,263, issued on May 24, 1988 to Larry D. Cook, describes a vehicle bumper stored telescopic crane hoist comprising a mast telescopically receiving a boom which supports a power head or winch assembly. The mast is supported by a jack. The tailgate can be lowered. The crane hoist is distinguishable for its required telescopic structure and jack.

U.S. Pat. No. 5,205,700, issued on Apr. 27, 1993 to Jhy-hong Lin et al., describes a load carrying attachment for any motor vehicle for transporting a personal mobility vehicle comprising a load carrying frame pivotally attached to a first frame member and which is pivotable from a storage position to an extended load carrying position transverse to and extending rearward from the first frame member. A hoist mechanism is attached to one end of the first frame member rotatable on the support about a vertical axis and pivotable thereon in a vertical plane. The apparatus is distinguishable for its limitation to carrying another smaller vehicle.

U.S. Pat. No. 5,211,526, issued on May 18, 1993 to Larry Robinette, describes a modular, readily assembled crane for mounting on a vehicle trailer hitch drawbar and reconfigurable for stand alone, rollabout operation. A receptacle rotatably supports a vertical column, a boom arm, and a hydraulic jack or a winch as the lifting device. An optional pair of outriggers support the crane against a closed tailgate. The crane is distinguishable for its required versatile structure utilizable as a mobile crane.

U.S. Pat. No. 5,419,672, issued on May 30, 1995 to Jimmy Poe, describes a tailgate hanger apparatus for hanging objects from and lifting objects onto the bed of a pickup truck, comprising a telescopic rod having a base end for supporting the rod, a tip end with a pulley system for lifting objects, and an intermediate portion for holding the tip in an upright pivotal position. The apparatus is supported by two chains attached to the sides of the pickup truck bed with an open tailgate and bolted at its bottom end to an angle iron. The tailgate hanger is distinguishable for its telescopic structure including a unique chain and bolted anchor system.

U.S. Pat. No. 5,662,451, issued on Sep. 2, 1997 to Vincent Muzzi et al., describes a game hoist attached to an all-terrain vehicle (ATV) comprising a horizontal boom on a vertical support shaft which telescopes and supports a winch and two-pulley system ending in a freely rotatable safety hook. The hoist is attached to a side of the ATV either in front or in back. The game hoist is distinguishable for its freely rotatable safety hook.

U.S. Pat. No. 5,993,137 issued on Nov. 30, 1999, to Robert E. Harr describes an adjustable hoist for introducing or removing objects from a vehicle. A main boom having a terminal hook is supported by two steel plates having a rearward support column and a forward hydraulic double action cylinder. A bottom mounting bracket supporting the boom is based on a turntable supported by the receiver mount to the vehicle, two outrigger legs and a jack opposite the receiver mount. The hoist is distinguishable for its required rotatable support system comprising a jack, receiver mount and outrigger legs.

None of the above inventions and patents, taken either singly or in combination, is seen to describe the instant invention as claimed.

SUMMARY OF THE INVENTION

The present invention is a foldable game hanger apparatus for attachment to the tow hitch of a pickup truck. The folded game hanger can be taken to the site in the bed of the truck and speedily installed in the tow hitch for hanging, cleaning and butchering large game, such as deer and small bears. The apparatus comprises a mast and fixed boom of square cross-section, and having a winch, pulleys and a gambrel with a pair of end hooks and a pair of pins which engage an apertured horizontal bar at the end of the boom to prevent the game from twisting. The horizontal bottom and top bars are locked in place by removable pins for operation and unlocked by removing the pins for folding the unit for storage. The bottom bar is inserted into a tow hitch and locked in place with the hitch pin. The bottom bar is preferably long enough to accommodate a lowered gate of the pickup truck. The game hanger apparatus has a loading capacity of at least 500 pounds.

Accordingly, it is a principal object of the invention to provide a game hanger apparatus for attachment to a pickup truck's trailer hitch.

It is another object of the invention to provide a game hanger apparatus that is foldable and readily removable from the truck.

It is a further object of the invention to provide a game hanger apparatus which has a gambrel that eliminates twisting of the game.

Still another object of the invention is to provide a game hanger apparatus having a fixed boom and a winch raising and lowering a gambrel at the end of the boom.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
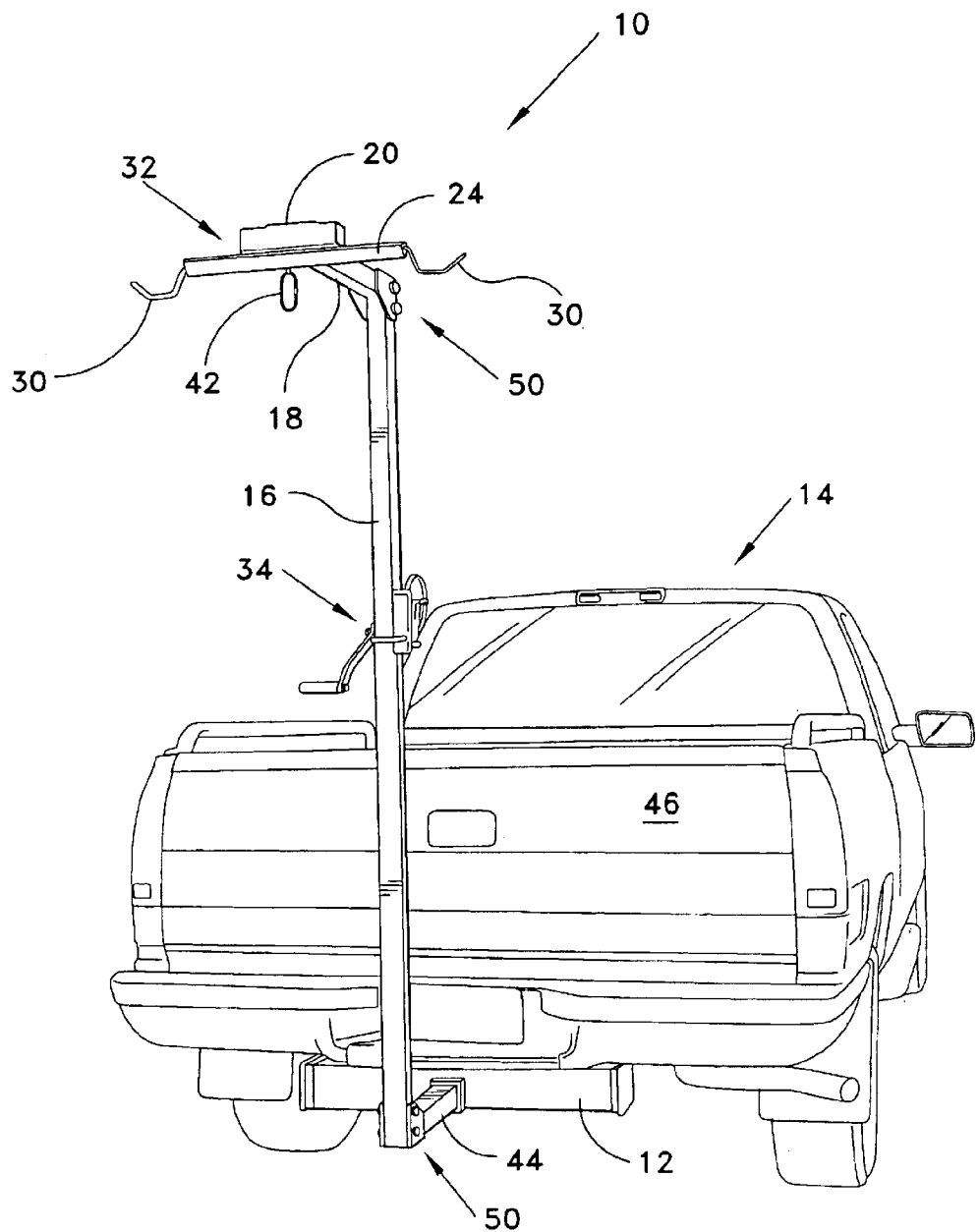
FIG. 1 is an environmental, perspective view of a game hanger apparatus attached to the rear of a pickup truck according to the present invention.
Figure 2:
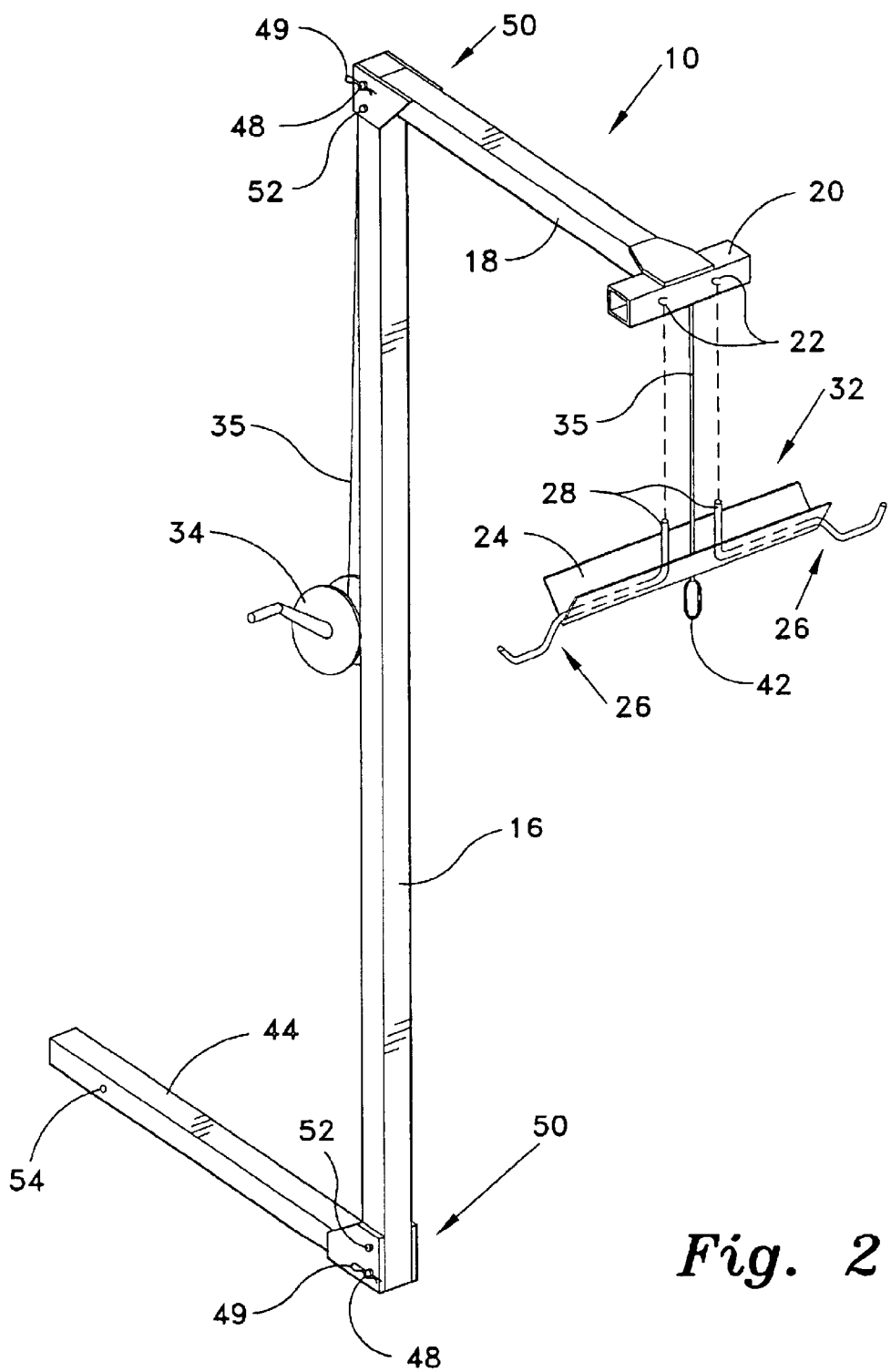
FIG. 2 is a front perspective view of the game hanger apparatus with the gambrel lowered.
Figure 3:
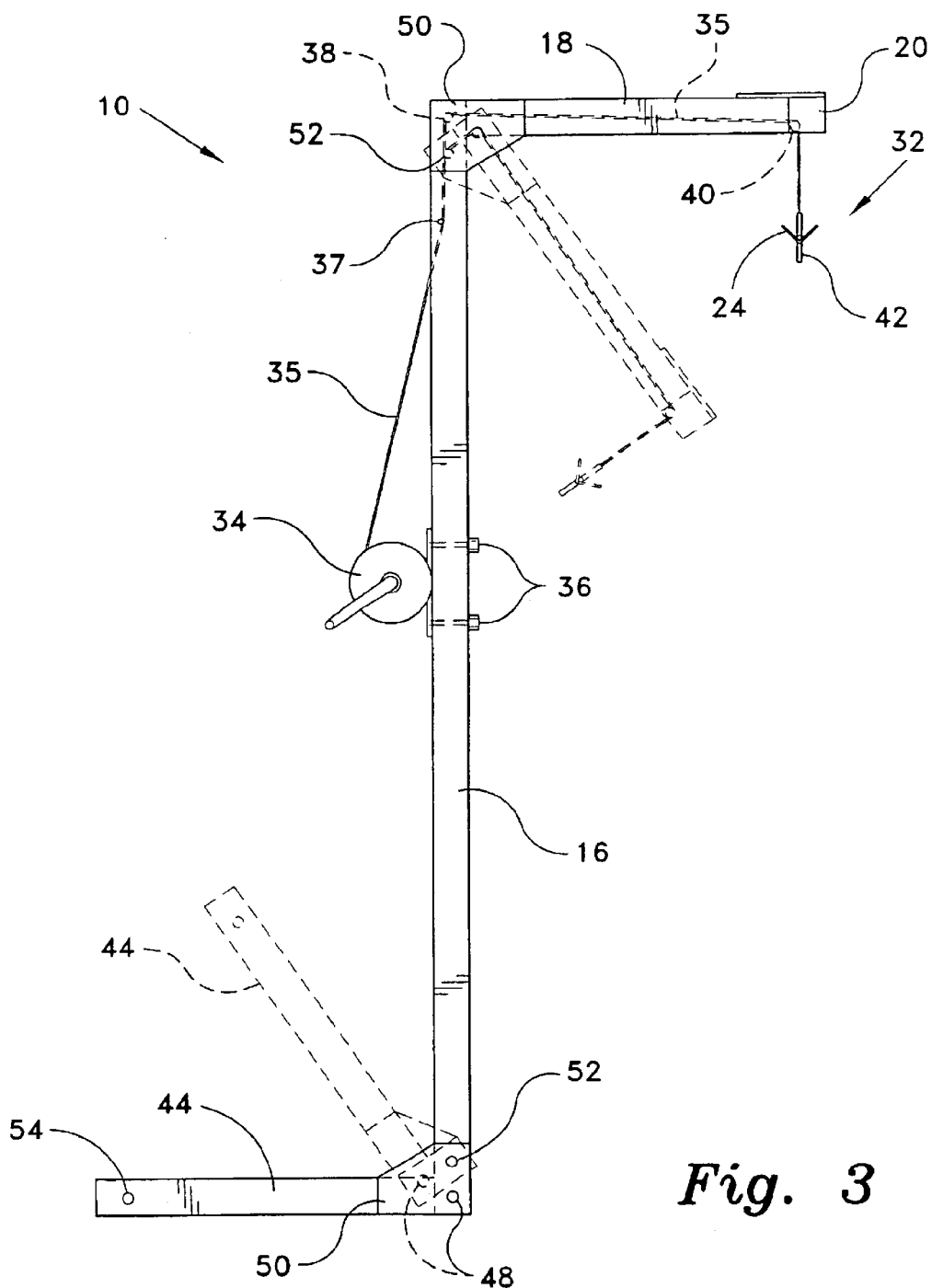
FIG. 3 is a side elevational view of the game hanger apparatus showing intermediate positions of the upper and lower horizontal parts in shadow.

The present invention as depicted in FIG. 1 is directed to a foldable game hanger apparatus 10 attachable to the tow hitch bar 12 of a pickup truck 14. An elongated upright mast 16 has a short boom element 18 at its upper end extending rearward from the pickup truck 14. A horizontal bar 20 or jib is attached normal to the end of the boom. The mast 16, boom 18, and jib 20 are each made from square tubing. The jib 20 has a pair of apertures 22 on its bottom surface shown in FIGS. 2 and 3.

A V-shaped channel element 24 supports a pair of rods 26, each rod 26 having an inner end bent upright to form a pin 28 and an outer end extending outside the channel 24 and defining a hook 30. The V-shaped channel element 24, the pair of rods 26 with their pins 28 and hooks 30 constitute a gambrel 32 for supporting game. When the gambrel 32 is raised, the pins 28 are inserted into the holes 22 in the bottom of the jib 20, which prevent the gambrel 32 from twisting as the game is skinned and slaughtered.

A winch 34 (FIGS. 1 through 4) is attached by fasteners 36 on the mast 16. A cable 35 is wound around the winch 34 and extends upward behind the mast 16 and enters the mast through a hole 37, continuing into the hollow boom element 18 over a first pulley 38 at the junction of the mast 16 and the boom 18. The cable 35 passes through the boom 18 and over a second pulley 40 at the junction of the boom 18 and the jib 20. The cable 35 exits through a hole in the bottom of the jib 20, extends through the V-shaped channel element 24 between the pins 28 in the gambrel 32, and terminates in a spring clamp 42 external to the gambrel. Thus, the winch 34 is used to raise and lower the gambrel 32 holding the animal.

The lower horizontal bar 44 has an aperture 54 at a free end for connection to the tow hitch bar 12 via a pin, and has a length greater than the height of a tailgate 46 of the pickup truck 14 to enable the tailgate 46 to be lowered while the game hanger apparatus 10 is being utilized. This is a secondary desirable feature of the present invention, which facilitates access to the bed of the pickup truck 14 for the cleaning supplies such as knives, saws and coolers. Furthermore, the open tailgate 46 can be utilized as a table.

Figure 4:
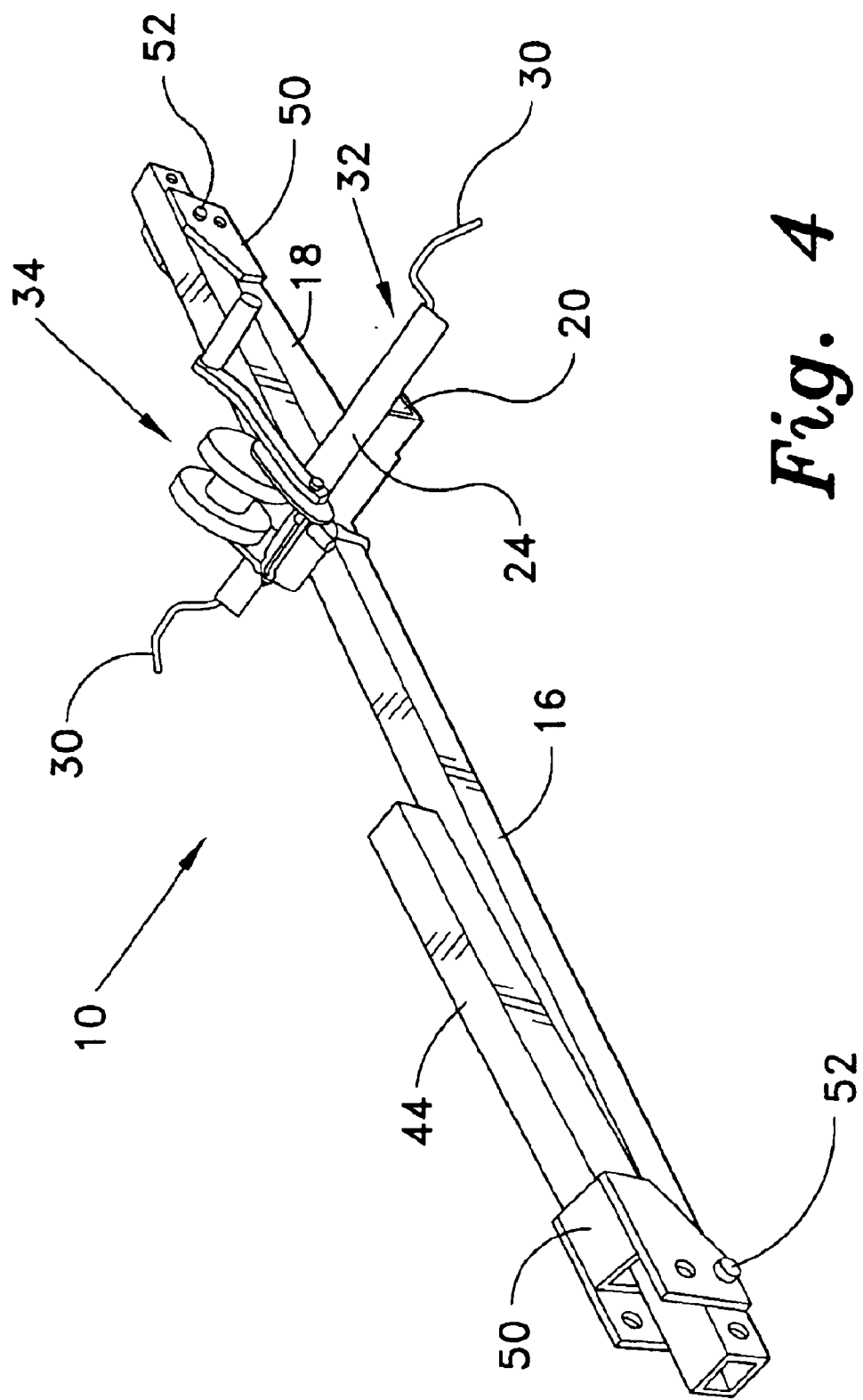
FIG. 4 is a perspective view of the folded game hanger apparatus without the cable.

As seen in FIG. 4, the opposite end of the bottom bar 44 has a pair of plates defining a clevis 50. The mast 16 is attached to the bottom bar 44 by a bolt which serves as a pivot pin 52 so that the bottom bar 44 can rotate around the pivot pin 52 until it is parallel to the mast 16 when the apparatus 10 is stored. When the hanger 10 is in use, a clevis pin 48 is inserted through aligned apertures in the clevis 50 and mast 16 and secured with a hitch pin 49 to lock the mast 16 in an upright position. Similarly, the boom 18 has a clevis 50 at one end and is attached to the upper end of the mast 16 by a pivot pin 52 so that the boom 18 may be folded against the mast 16 for storage. When in use, the boom 18 is locked in a fixed position normal to the mast 16 by inserting the clevis pin 48 through aligned apertures in the clevis 50 and the mast 16, and securing with a hitch pin 49.

It is to be understood that the present invention is not limited to the sole embodiment described above, but encompasses any and all embodiments within the scope of the following claims.

We claim:

1. A foldable game hanger apparatus with a non-rotatable gambrel for attachment to a trailer hitch of a pickup truck, the game hanger apparatus comprising:

a bottom bar adapted for attachment to a trailer hitch of a pickup truck, the bottom bar having a clevis at one end;

a mast having a lower end pivotally attached to said bottom bar by a pivot pin and having an upper end;

a boom having a first end with a clevis and having a second end, the boom being pivotally attached to the upper end of said mast by a pivot pin;

a jib attached to the second end of said boom normal to said boom, said jib having a pair of spaced apart holes defined therein;

a gambrel having an elongate body with a first end and a second end, a first hook extending from the first end and a second hook at the second end for attaching game to the gambrel, and having a pair of pins disposed between the first end and the second end and extending normal from the elongate body; and a winch attached to said mast having a cable extending through said mast, said boom, and said jib, and being attached to said gambrel in order to raise and lower said gambrel;

wherein the pins extending from said gambrel slide into the holes defined in said jib when said gambrel is raised, whereby game is precluded from twisting on said gambrel.

2. The game hanger apparatus according to claim 1, wherein the bottom bar has a length greater than the height of a tailgate of the pickup truck to enable the tailgate to be lowered while the game hanger apparatus is being utilized.

3. The game hanger apparatus according to claim 1, further comprising first locking means for locking said mast in an upright position normal to said bottom bar.

4. The game hanger apparatus according to claim 3, wherein said first locking means comprises:

a clevis pin inserted through the clevis on said bottom bar and through the lower end of said mast; and a hitch pin inserted through said clevis pin.

5. The game hanger apparatus according to claim 1, further comprising second locking means for locking said boom in a position normal to said mast.

6. The game hanger apparatus according to claim 5, wherein said second locking means comprises:

a clevis pin inserted through the clevis on said boom and through the upper end of said mast; and a hitch pin inserted through said clevis pin.

\* \* \* \* \*